United States Patent Office.

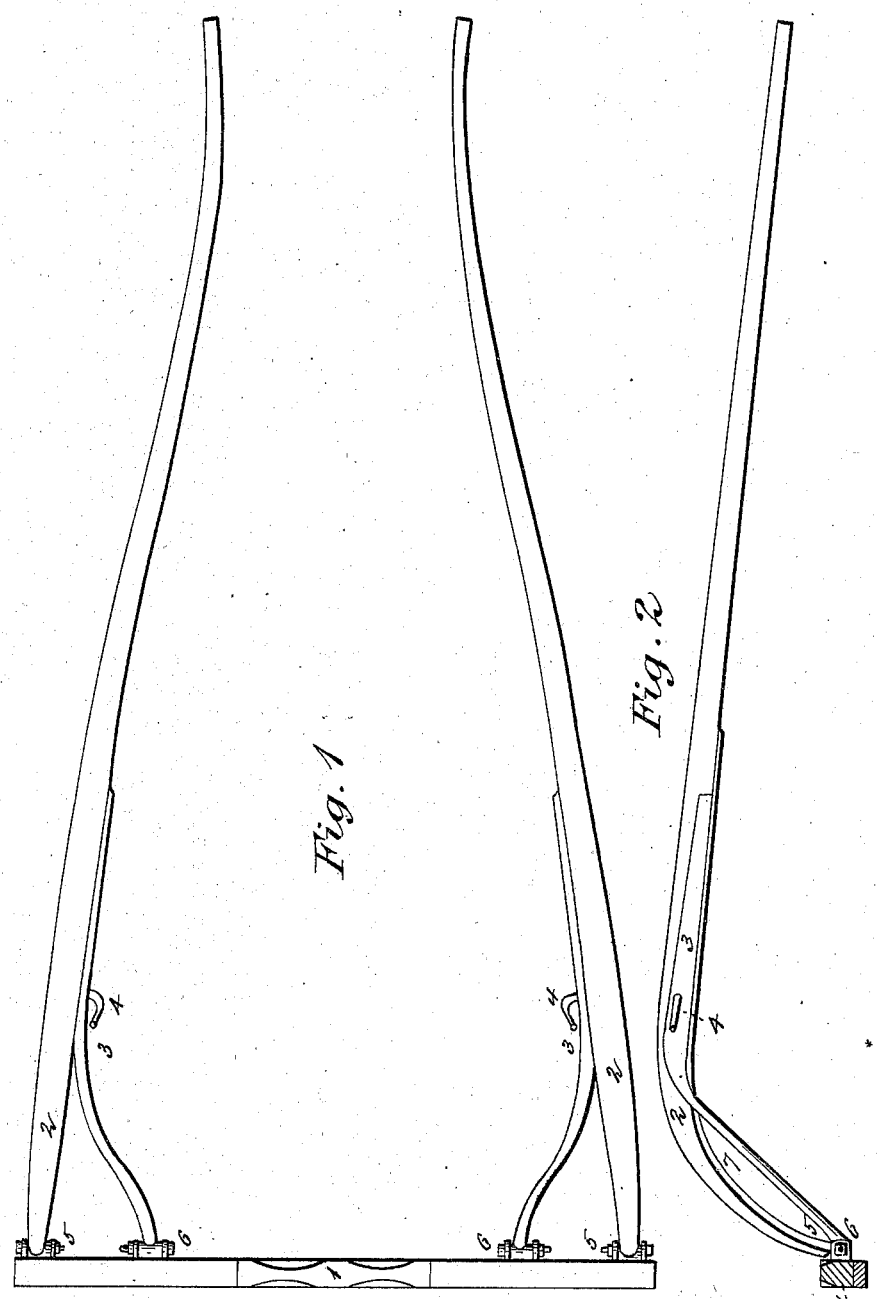

WILLIAM W. T. GREENWAY, OF BALTIMORE, MARYLAND.

Letters Patent No. 94,933, dated September 14, 1869.

IMPROVED THILL FOR CARRIAGES.

The Schedule referred to in these Letters Patent and making part of the same.

*To all whom it may concern:*

Be it known that I, WILLIAM W. T. GREENWAY, of Baltimore, in the county of Baltimore, and State of Maryland, have invented certain new and useful Improvements in Thills for Carriages; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel manner of constructing and attaching thills to carriages, as hereinafter explained.

Figure 1 is a top plan view, and

Figure 2 is a side elevation.

In the ordinary manner of constructing thills, they are united by one or more cross-bars, and require a whiffletree to be used with them, which is objectionable for several reasons.

In constructing my improved thills, I make the shafts 2 in the usual form, but instead of connecting them by a cross-bar, each is attached separately to the axle 1 by a bolt or fastening of any suitable kind, as shown in fig. 1.

To the inner side of each shaft, I firmly secure a curved brace, 3, the rear end of which is also attached to the axle, in the same manner as the shaft, as clearly represented in figs. 1 and 2. A hook, 4, is secured to the inner side of each of the shafts, for attaching the traces to, and by which the animal draws the carriage.

By this method of constructing and attaching the thills, I accomplish several objects. The cross-bar and whiffletree being dispensed with, there is a free open space left for the horse's tail, which is thereby prevented from being whipped off or shortened. Each shaft can be raised or lowered independent of the other, by which means the horse can be put in place by elevating one, and leading him in from the side, without danger of breaking it by stepping on it, as when led over it or backed between them. Each shaft, also, is free to accommodate itself to the undulating movements of the carriage, as the front wheels, either of them, rise or fall, in passing over uneven ground. In case one tug becomes loose, the carriage is drawn by the other, and the dropping of the thills is prevented, as would be the case if a whiffletree were used. Besides, if one thill, or shaft becomes detached, when constructed in the usual manner, the other, being secured at one point only, has no control over the movements of the front axle and wheels, and cannot, therefore, guide the vehicle, a most prolific source of runaways and serious accidents.

By my plan, each thill is so attached and braced that it will guide and control the movements of the vehicle, independent of the other.

It is obvious that my improvement may be applied to all kinds of one-horse vehicles having four wheels.

Having thus described my invention,

What I claim, is—

1. The use, in connection with vehicles, of the shafts, or thills 2, separately hinged and braced thereto, so that each may move vertically, independent of the other, and be rigidly braced laterally, substantially as described.

2. In combination with the said brace and shaft, a suitable trace-fastening, substantially as set forth.

WM. W. T. GREENWAY.

Witnesses:
J. McKENNEY,
W. C. DODGE.